May 11, 1926.
W. M. ROBERTS
ICE CREAM CONE
Filed Sept. 4, 1924
1,584,653
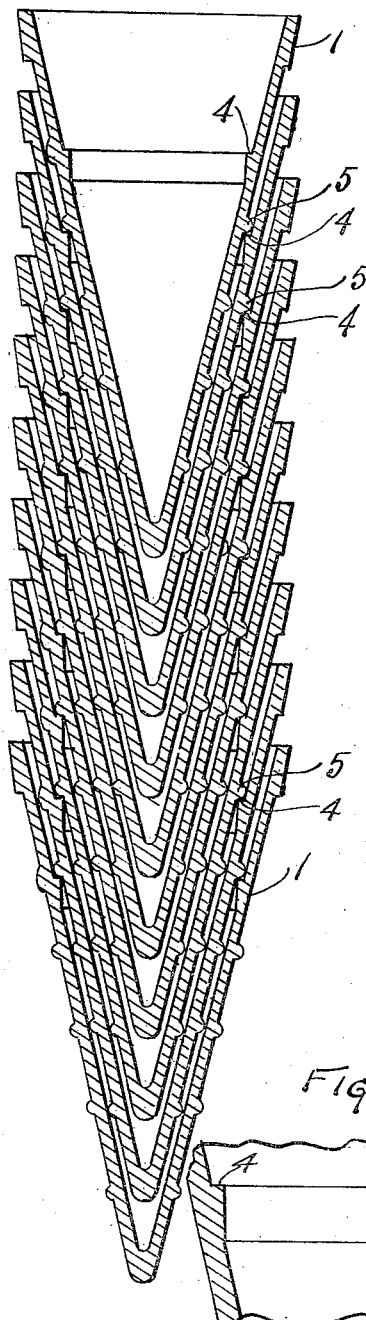
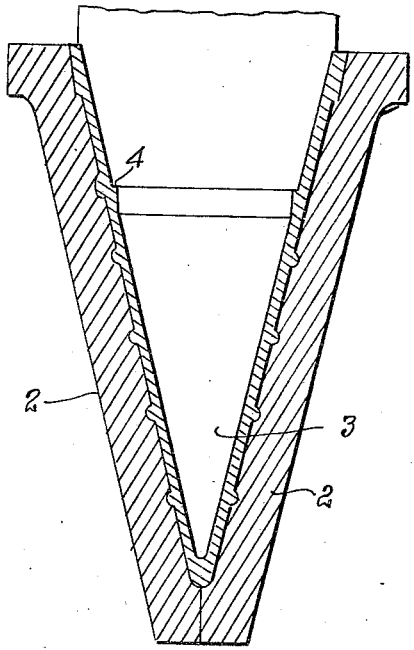
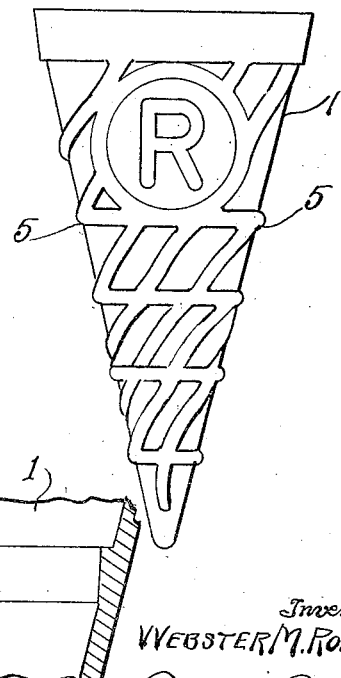
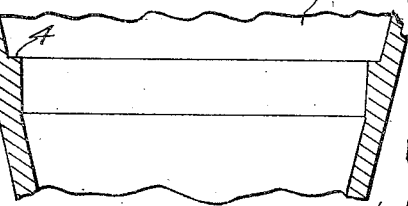
Inventor
WEBSTER M. ROBERTS,
By Toulmin & Toulmin,
Attorneys Patented May 11, 1926.

1,584,653

UNITED STATES PATENT OFFICE.

WEBSTER M. ROBERTS, OF ST. JOSEPH, MISSOURI, ASSIGNOR TO ROBERTS CONE MANUFACTURING COMPANY, OF ST. JOSEPH, MISSOURI, A CORPORATION OF MISSOURI.

ICE-CREAM CONE.

Application filed September 4, 1924. Serial No. 735,777.

This invention relates to what is known as ice cream cones intended for use by retail ice cream dealers. The ice cream is placed in these cones, which being edible themselves constitute a most appropriate holder for the ice cream as they can be eaten along with the ice cream without the use of spoons.

The object of my invention is to provide a means whereby cones can be nested one within the other for the purposes of shipment and storage yet without danger of any inserted cone breaking, chipping or injuring the outer cone in which it is inserted.

To this end I form each cone with an interior shoulder and with an exterior excrescence or rib, the latter usually being a part of the ornamental scroll work on the exterior of the cone. I further so position the wall of the shoulder that the inserted cone may readily enter into and be withdrawn from the outer cone. A further feature is that of the location of the interior shoulder sufficiently remote from the open end of the cone to prevent any tendency of the inner cone breaking the outer one as the wall of the cone is stronger down in the body thereof away from the open end than it is at the open end.

By this character and location of interior shoulder I am enabled to stack the cones one within the other in large numbers without danger of breakage and with perfect facility for insertion and removal.

In the accompanying drawings:—

Fig. 1 is a sectional view showing a plurality of cones embodying my improvements nested for the purpose of packing;

Fig. 2 is a sectional view of one such cone and the mold and core for baking same;

Fig. 3 is an elevation of the exterior of such cone showing the filigree design; and Fig. 4 is an enlarged detail sectional view illustrating more clearly the shoulder formed on the interior of the cone.

Referring to the drawings in detail, 1 designates a cone made of sweetened batter which is baked in a mold 2 forming the outside of the cone, the interior thereof being formed by a core 3. The cone so formed is closed at the bottom and open at the top to provide a receptacle for ice cream, which enables persons to eat ice cream without the use of spoons and at the same time provides a delectable edible which may be consumed along with the ice cream.

In order to enable such cones to be stacked one within another, as shown in Fig. 1, and shipped and later separated without breaking or in any way injuring the same I have provided on the interior of the cones by means of a depression in the core 3 an annular shoulder 4 whose inner face is at a less angle to the vertical than the wall of the cone. For example, cones of this character are usually made with their walls at an angle of about $11\frac{1}{2}$ degrees to the vertical and I have found that if the shoulder 4 is at an angle of about $1\frac{1}{2}$ degrees to the vertical the desired result will be obtained.

The exterior of the cone has a filigree design, as shown in Fig. 3, which comprises a ring or rib 5. The annular extension or shoulder 4 on the interior of the cone is positioned at a point more or less remote from the open end of the cone, in the present instance a distance equal to about one-fourth the length of the cone, and has the advantage of not only strengthening the cone at this point, but by being so located it requires a great deal more pressure for one cone to break another when nested for purposes of packing than it would if the point of contact between the cones was near the top, as any cone is stronger down in the body thereof away from the open end.

It will further be noted that the location of the shoulder 4 is such that when one cone is placed in another the rib 5 on the exterior of the inserted cone will rest on the shoulder 4 on the interior of the receiving cone and prevent the inserted cone from going too far into the other cone. In this way only one point of contact exists between the cones, as shown in Fig. 1, which prevents one cone from working in the other, thereby obviating splitting of the cones, as well as sticking together thereof. It is essential to deliver high quality cones in perfect condition and from the foregoing it will be seen that cones so made may be readily nested for shipping and as readily separated by the purchaser when desired, free from any tendency to stick or break.

While I have shown and described one embodiment of my invention it will be understood that I do not desire to be limited to the details thereof, as obvious modifications will occur to a person skilled in the art.

Having thus fully described my invention, what I claim as new and desire to secure by Letters Patent, is:—

1. As a new article of manufacture, an ice cream cone having an interior shoulder adapted to contact with and support another cone nested in it.

2. As a new article of manufacture, an ice cream cone having an interior inwardly projecting shoulder removed from its open end and adapted to contact with and support another cone nested in it.

3. As an article of manufacture, an ice cream cone having an interior inwardly projecting shoulder removed from its upper end and an exterior rib, so that its interior will support an inserted cone and will itself be supported when inserted in another cone.

4. As a new article of manufacture, an ice cream cone having an interior annular shoulder whose inner face is at a less angle to the vertical than the wall of the cone.

5. As a new article of manufacture, an ice cream cone having an interior annular shoulder whose inner face is at a less angle to the vertical than the wall of the cone, such shoulder being located removed from the open end of the cone.

In testimony whereof, I affix my signature.

WEBSTER M. ROBERTS.